United States Patent Office 3,687,641
Patented Aug. 29, 1972

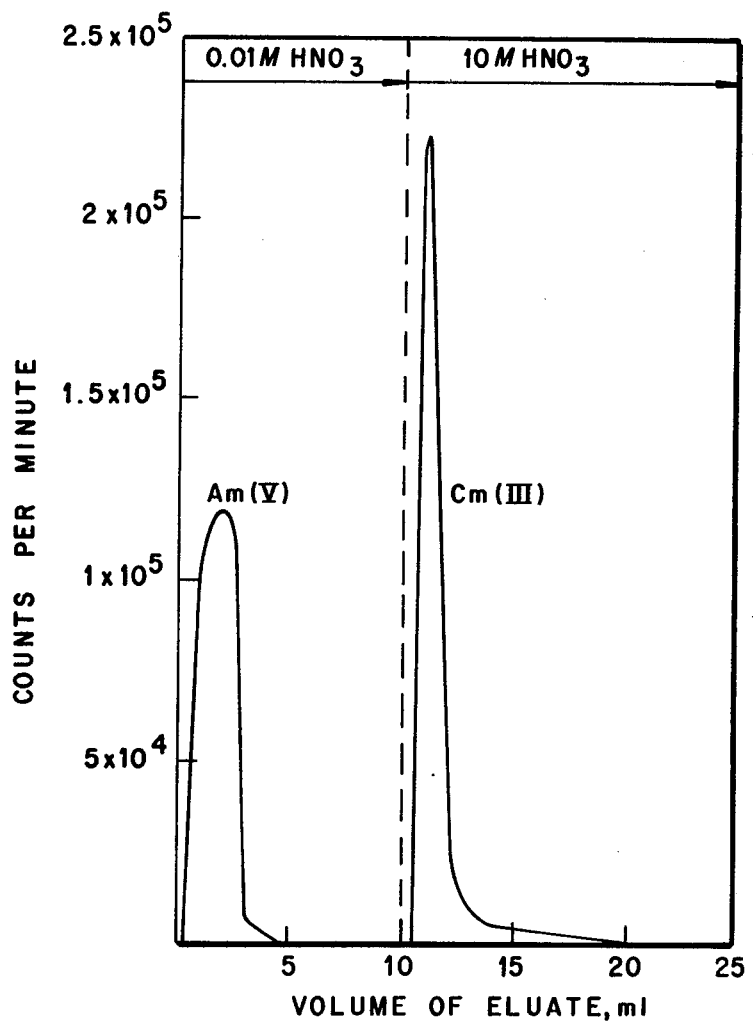

3,687,641
SEPARATION AND RECOVERY OF AMERICIUM FROM CURIUM AND OTHER ELEMENTS
Fletcher L. Moore, Knoxville, Tenn., assignor to the United States of America as represented by the United States Atomic Energy Commission
Continuation-in-part of application Ser. No. 780,101, Nov. 29, 1968, now Patent No. 3,615,268. This application Mar. 9, 1971, Ser. No. 122,371
Int. Cl. C01g 56/00
U.S. Cl. 423—6                            3 Claims

ABSTRACT OF THE DISCLOSURE

A method is provided for the separation of americium from curium dissolved in a dilute aqueous solution of nitric acid which comprises selectively oxidizing the americium to the +5 oxidation state, passing the resultant solution through a porous packed column of crystalline zirconium phosphate, and then selectively eluting an americium-containing solution.

BACKGROUND OF THE INVENTION

The invention described herein was made in the course of, or under, a contract with the U.S. Atomic Energy Commission.

This application is a continuation-in-part of my copending application Ser. No. 780,101, filed Nov. 29, 1968, now Patent 3,615,268.

The present invention relates to a method for the separation of americium from curium, other actinide elements, lanthanide elements, and alkali earth elements, such as cesium.

The advent of high nutron flux reactors allows the production of transplutonium elements. Maximum utilization of these elements requires their separation and purification. One of the more difficult of the several separating problems associated with transplutonium elements is the clean-cut separation of americium from curium.

It is therefore an object of this invention to separate americium from curium.

A concomitant object is to effect separation of americium from other transplutonium elements, lanthanide elements, and alkali earth elements.

Present techniques available for effecting the desired exchange utilize either organic systems, namely, organic ion exchange resins, or organic solvent extraction systems. Both resins and organic solvents are chemically unstable under the high radiation emitted by the transplutonium isotopes to produce by-products which interfere with the otherwise high separative capacity of these reagents.

While a limited number of inorganic systems are available, they are based on multiple precipitations, requiring time-consuming manipulations which permit quantitative recovery, and are inappropriate for rapid analytical or pioduction-scale applications.

SUMMARY AND DESCRIPTION OF THE INVENTION

The method of the present invention provides a rapid and near-quantitative separation of americium from curium and other element impurities mentioned above and is predicated on the discovery that americium in the +5 oxidation state is the least sorbable ionic species of an aqueous nitric acid solution containing a mixture of ionic species of other transplutonium elements, rare earth elements, and alkali earth elements sorbed on the surface of a mass of microcrystalline gel particles of zirconium phosphate. Zirconium phosphate cation exchange crystals suitable for the practice of this invention are available commercially from Bio-Rad Laboratories, Richmond, Calif.

In order to practice this invention a porous column of zirconium phosphate crystals (50–100 mesh) is prepared by forming an aqueous slurry of the crystals in dilute (0.1 M) nitric acid and pouring the slurry in incremental amounts down a glass or other suitable column containing a constricted or valved bottom end. After each addition of slurry the column is tapped gently in order to eliminate air bubbles and avoid channeling. The column is packed to a suitable height and drained of excess liquid. The wet column is now suitable to receive an aqueous feed to effect the desired separation.

In order to prepare a suitable feed, the americium must be in the +5 oxidation state. A dilute 0.01 to 0.1 M aqueous solution of nitric acid containing from 0.05 to 0.1 M ammonium persulfate will oxidize the americium-containing solution at a temperature in the range 80–90° C. up to 15 minutes, followed by cooling to room temperature. Ammonium persulfate concentrations in excess of 0.2 M should be avoided since they appear to lower the distribution coefficient of trivalent ions for zirconium phosphate. A typical column condition for accomplishing the separation of americium and curium is a 5 x 30 mm. column of zirconium phosphate prepared as described above at room temperature and at a feed flow rate of from 0.1 to 0.5 milliliter per minute. Selective elution of americium is accomplished by a volume of 0.01 M nitric acid; elution of curium is effected by a volume of from 2 M to 10 M $HNO_3$. A typical elution curve which demonstrates the separation achieved by practicing this invention is shown in the figure.

The recovery from americium is nearly quantitative, with yields averaging at least 90 percent and with curium decontamination factors in excess of $2.5 \times 10^5$. Decontamination factor is defined as the total amount of element in the feed solution divided by the total amount found in the americium eluate product solution. The method is simple, effective, and rapid, requiring only about 1½ hours to effect the desired separation and recovery.

The zirconium phosphate-nitric acid system described affords an impressive separation of americium, not only from curium but also from other actinide elements, lanthanide elements, and cesium.

EXAMPLE

One milliliter of a typical feed solution (composition as given in the table below) was adjusted to 0.01 M $HNO_3$– 0.1 M $(NH_4)_2S_2O_8$. After gently mixing the solution, the americium was oxidized by heating in a water bath at 80–90° C. for 10 minutes. The oxidized solution was cooled 5–10 minutes at room temperature after which it was transferred to the zirconium phosphate column (preparation described above) and eluted with 0.01 M $HNO_3$ at a flow rate of about 0.3 milliliter per minute until a 10-milliliter eluate containing the americium was collected. Curium (along with berkelium, californium, uranium, and rare earths) was eluted with 10 milliliters of 10 M $HNO_3$.

Feed composition, as well as the decontamination factor for each feed component, is shown in the table below.

TABLE

Decontamination of americium in the zirconium phosphate-nitric acid method

| Element | Typical feed of a 0.1 M nitric acid solution containing, in counts/min./ml. | Decontamination factor |
|---|---|---|
| Cesium-137 | $3 \times 10^5$ ($\gamma$) | $>5.5 \times 10^5$ |
| Europium-152-4 | $2.5 \times 10^6$ ($\gamma$) | $>2 \times 10^5$ |
| Uranium-233 | $1.2 \times 10^6$ ($\alpha$) | $3 \times 10^2$ |
| Plutonium-239 | $3.5 \times 10^6$ ($\alpha$) | 8.5 |
| Curium-244 | $2.7 \times 10^6$ ($\alpha$) | $>2.5 \times 10^5$ |
| Berkelium-249 | $4.3 \times 10^6$ ($\beta$) | $2.1 \times 10^2$ |
| Californium-252 | $1.5 \times 10^6$ ($\alpha$) | $>4.5 \times 10^5$ |
| Americium-241 | $1.2 \times 10^5$ ($\alpha$) | |

In summary, the method of this invention for the separation of americium is valuable on an analytical scale as well as useful in a preparative process. The method is simple, fast, operates at room temperature with good flow without the necessity to resort to vacuum or high-pressure techniques, and requires few manipulations—features which are advantageous for operation in a glove box or in a hot-cell facility.

What is claimed is:

1. A method for the separation of americium from curium dissolved in a dilute aqueous solution of nitric acid which comprises selectively oxidizing the americium to the +5 oxidation state, passing the resultant solution through a porous packed column of crystalline zirconium phosphate, and then selectively eluting an americium-containing solution.

2. The method according to claim 1 in which the americium is oxidized to the +5 oxidation state with a dilute aqueous nitric acid solution which contains no more than 0.2 M ammonium persulfate.

3. The method according to claim 1 in which the americium is selectively eluted with a 0.01 to 0.1 M aqueous nitric acid solution.

References Cited

UNITED STATES PATENTS 3,484,216 12/1969 Ahrland _____ 23—337
3,615,268 10/1971 Moore _____ 23—337

OTHER REFERENCES

Horwitz: J. Inorg. Nucl. Chem., 28, 1469–1478 (1966).

CARL D. QUARFORTH, Primary Examiner

E. A. MILLER, Assistant Examiner